(12) United States Patent
Kramer et al.

(10) Patent No.: US 7,527,666 B2
(45) Date of Patent: May 5, 2009

(54) HONEYCOMB BODY WITH FISSURED END SIDES

(75) Inventors: Jan Kramer, Macomb, MI (US); Ferdi Kurth, Mechernich (DE); Udo Schmidt, Neunkirchen (DE); Hans-Günter Faust, Köln (DE); Ludwig Wieres, Overath (DE)

(73) Assignee: Emitec Gesellschaft Fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/845,799

(22) Filed: Aug. 28, 2007

(65) Prior Publication Data

US 2008/0083214 A1 Apr. 10, 2008

Related U.S. Application Data

(63) Continuation of application No. PCT/EP2006/001670, filed on Feb. 23, 2006.

(30) Foreign Application Priority Data

Feb. 28, 2005 (DE) .................. 10 2005 009 585

(51) Int. Cl.
 *B01D 39/10* (2006.01)
 *B01D 39/14* (2006.01)
(52) U.S. Cl. ............... 55/521; 55/525; 55/DIG. 30; 428/116; 428/593
(58) Field of Classification Search .......... 55/520, 55/521, 525, 526; 422/177; 428/593, 116; 502/527.18, 527.19, 527.22
See application file for complete search history.

(56) References Cited

U.S. PATENT DOCUMENTS

| 4,273,681 | A | 6/1981 | Nonnenmann |
| 4,803,189 | A | 2/1989 | Swars |
| 4,832,998 | A | 5/1989 | Cyron |
| 4,923,109 | A | 5/1990 | Cyron |
| 4,946,822 | A | 8/1990 | Swars |
| 5,045,403 | A | 9/1991 | Maus et al. |
| 5,105,539 | A | 4/1992 | Maus et al. |

(Continued)

FOREIGN PATENT DOCUMENTS

DE 2902779 A1 7/1980

(Continued)

*Primary Examiner*—Duane S Smith
*Assistant Examiner*—Robert A Clemente
(74) *Attorney, Agent, or Firm*—Laurence A. Greenberg; Werner H. Stemer; Ralph E. Locher (57) ABSTRACT

A honeycomb body includes an inlet end side and an outlet end side. Metal sheets are wound, intertwined and/or layered into a multiplicity of sheet metal layers being at least partially structured to form channels leading from the inlet end side to the outlet end side. Edges of at least some of the sheet metal layers have cutouts formed therein at the inlet end side and/or the outlet end side, resulting in a fissured structure of the inlet end side and/or the outlet end side. As a result, only the smooth metal sheets or only the structured metal sheets or both can be provided with the cutouts. Additionally, at least some of the metal sheets can be made of a porous material, in particular compressed metal fibers. Deposition of soot particles on the end sides of the honeycomb body is, to a large extent, prevented due to the cutouts.

19 Claims, 5 Drawing Sheets

U.S. PATENT DOCUMENTS

| | | | |
|---|---|---|---|
| 5,130,208 A | 7/1992 | Maus et al. | |
| 5,139,844 A | 8/1992 | Maus et al. | |
| 5,157,010 A | 10/1992 | Maus et al. | |
| 5,403,559 A | 4/1995 | Swars | |
| 5,599,509 A * | 2/1997 | Toyao et al. | 422/180 |
| 5,658,536 A * | 8/1997 | Okabe et al. | 422/180 |
| 6,190,784 B1 | 2/2001 | Maus et al. | |
| 6,365,283 B1 * | 4/2002 | Bruck | 428/593 |
| 6,776,814 B2 * | 8/2004 | Badeau et al. | 55/385.3 |
| 2004/0244345 A1 | 12/2004 | Endo | |
| 2007/0196248 A1* | 8/2007 | Mizutani | 422/180 |

FOREIGN PATENT DOCUMENTS

| | | |
|---|---|---|
| DE | 8816154 U1 | 2/1989 |
| EP | 0705962 A1 | 4/1996 |
| EP | 0245737 B1 | 8/1998 |
| EP | 1484484 A1 | 12/2004 |
| JP | 9245938 A | 9/1997 |
| JP | 2002282707 A | 10/2002 |
| JP | 2003033665 A | 2/2003 |
| WO | 9003220 A1 | 4/1990 |
| WO | 9008249 A1 | 7/1990 |
| WO | 9101178 A1 | 2/1991 |
| WO | 9101807 A1 | 2/1991 |
| WO | 9749905 A1 | 12/1997 |

* cited by examiner

HONEYCOMB BODY WITH FISSURED END SIDES

CROSS-REFERENCE TO RELATED APPLICATIONS

This is a continuing application, under 35 U.S.C. § 120, of copending International Application No. PCT/EP2006/001670, filed Feb. 23, 2006, which designated the United States; this application also claims the priority, under 35 U.S.C. § 119, of German Patent Application DE 10 2005 009 585.2, filed Feb. 28, 2005; the prior applications are herewith incorporated by reference in their entirety.

BACKGROUND OF THE INVENTION

Field of the Invention

The present invention relates to a metallic honeycomb body, in particular for the purification of exhaust gas of an internal combustion engine. A particular field of use is the removal of particles from an exhaust gas.

A distinction is made primarily between two typical structures of metallic honeycomb bodies. An early structure, of which German Published, Non-Prosecuted Patent Application DE 29 02 779 A1, corresponding to U.S. Pat. No. 4,273,681, shows typical examples, is the spiral structure in which substantially one smooth and one corrugated metal sheet are placed one on top of the other and wound into a spiral shape. In another structure, the honeycomb body is constructed from a plurality of alternately disposed smooth and corrugated or differently corrugated metal sheets, with the metal sheets initially forming one or more stacks which are intertwined with one another. In that case, the ends of all of the metal sheets are situated at the outside and can be connected to a housing or casing tube, as a result of which several connections are generated which increase the durability of the honeycomb body. Typical examples of that structure are described in European Patent EP 0 245 737 B1, corresponding to U.S. Pat. Nos. 4,832,998, 4,803,189, 4,946,822 and 4,923,109 or International Publication No. WO 90/03220, corresponding to U.S. Pat. Nos. 5,105,539 and 5,139,844. It has also been long known to equip the metal sheets with additional structures in order to influence the flow and/or to obtain transverse mixing between the individual flow channels. Typical examples of embodiments of that type are International Publication No. WO 91/01178, corresponding to U.S. Pat. No. 5,403,559, International Publication No. WO 91/01807, corresponding to U.S. Pat. Nos. 5,130,208 and 5,045,403 and International Publication No. WO 90/08249, corresponding to U.S. Pat. No. 5,157,010. Finally, there are also honeycomb bodies with a conical structure, if appropriate also with further additional structures for influencing flow. A honeycomb body of that type is, for example, described in International Publication No. WO 97/49905, corresponding to U.S. Pat. No. 6,190,784. Furthermore, it is also known to leave free a cutout in a honeycomb body for a sensor, in particular for accommodating a lambda probe. An example thereof is described in German Utility Model DE 88 16 154 U1.

All honeycomb bodies of that type have a plurality of at least partially structured sheet metal layers having a structuring which forms channels that lead from an inlet face to an outlet face of the honeycomb body. The term sheet metal layers means the successive layers of the honeycomb body, regardless of whether the sheet metal layers are constructed from one or more separate metal sheets. It is pointed out that it is fundamentally possible to construct a honeycomb body from only a single metal sheet by virtue of, for example, a part of the sheet metal strip being corrugated and the remaining, smooth part of the sheet metal strip being folded onto the corrugated part by bending. The structure which is formed in that way can be wound in a spiral shape proceeding from the bend line to form a honeycomb body. The next possibility is to use one smooth and one corrugated metal sheet for producing a spiral-shaped wound honeycomb body. Multiple spirals formed from three or more metal sheets are also possible. There are finally a large number of structures which are produced from one or more stacks of alternating smooth and corrugated metal sheets. Honeycomb bodies of that type contain a plurality of metal sheets, with it however, not being strictly necessary for the number of the metal sheets and the number of sheet metal layers, which are placed one on top of the other, to be equal. For that reason, a distinction is made in principle between a metal sheet and a sheet metal layer, even if that is often not possible, for example, in drawings which show only a portion of a honeycomb body.

Tests have shown that honeycomb bodies in an exhaust gas flow which contains soot particles can become completely or partially clogged at the end side as a result of deposited soot particles. That adversely affects the normal function, in particular as a soot filter, and/or makes regeneration more difficult.

SUMMARY OF THE INVENTION

It is accordingly an object of the invention to provide a honeycomb body with fissured end sides, which overcomes the hereinafore-mentioned disadvantages of the heretofore-known devices of this general type and in which there is a reduced probability of the deposition of soot particles at the end sides.

With the foregoing and other objects in view there is provided, in accordance with the invention, a honeycomb body, comprising an inlet end side and an outlet end side, and metal sheets being wound, intertwined and/or layered into a multiplicity of sheet metal layers having edges and being at least partially structured to form channels leading from the inlet end side to the outlet end side. The edges of at least some of the sheet metal layers have cutouts formed therein at the inlet end side and/or the outlet end side resulting in a fissured structure of the inlet end side and/or the outlet end side.

One reason for the deposition of soot particles at the end side of a honeycomb body is that the end faces of the honeycomb body structure are aligned perpendicularly with respect to the flow direction. Soot particles therefore impact almost exactly perpendicularly against the end faces of the honeycomb body. Two effects are obtained at the same time by creating a fissured structure at the inlet end side. On one hand, purely from a geometric sense, considerable parts of the end face of the honeycomb body are now no longer aligned exactly perpendicularly with respect to the flow direction and, on the other hand, the profile of the flow as it enters the individual channels is influenced in such a way that only a few particles can impinge frontally against the end face. In addition, any soot depositions which are generated are already situated partially in the interior of the channels, so that a catalytic reaction can be more easily initiated as a result of contact with catalytically coated channel walls. Any depositions which are generated can therefore be more easily eliminated again.

It is fundamentally possible to obtain a fissured structure at the end sides of a honeycomb body through the use of very different measures. One possibility is the use of sheet metal layers with different widths in a honeycomb body which, however, can lead to difficulties in production terms and with regard to reproducibility. It is more advantageous if sheet metal layers with identical widths can be used. In order to nevertheless generate a fissured end side, at least a part of the sheet metal layers must be provided with end-side cutouts, with the size and the shape of the cutouts being variable within wide limits. In order to achieve the set object, it is fundamentally necessary only for the inlet-side end side of a honeycomb body to be fissured, but it is often undesirable for a honeycomb body to have a certain orientation when it is installed. For this reason, it can be advantageous to construct a honeycomb body to be symmetrical so that it can be used in any desired installation direction.

In accordance with another feature of the invention, the honeycomb bodies are constructed from alternating layers of substantially smooth and corrugated metal sheets, and only the smooth metal sheets, or only the corrugated metal sheets, or both, have cutouts.

In accordance with a further feature of the invention, in the case of honeycomb bodies which are constructed as particle filters, in particular for the removal of soot particles, a part of the sheet metal layers is often composed of porous material, in particular of compressed metal fibers. Within the context of the present invention, metal sheets can therefore also be composed of porous material, in particular of fibrous material. The invention can be used for practically all known metallic honeycomb bodies which are constructed from one or more metal sheets, regardless of which additional openings, structures or other peculiarities such honeycomb bodies have.

For reasons of higher mechanical strength, however, metallic honeycomb bodies which are constructed from sheet metal layers are often brazed at their end sides, that is to say the metallic sheet metal layers are brazed to one another at the end side at their contact points. In the case of a heavily fissured structure of the end sides, there is, of course, the problem in this case that conventional methods for brazing the sheet metal layers to one another cannot be directly applied. For this reason, in accordance with an added feature of the invention, it is advantageous to provide the metal sheets with cutouts, not all over their end sides, but rather to provide sections at their end-side edges without cutouts. The sections are long enough and frequent enough to ensure that a plurality of contact points still remain statistically distributed between the frontmost and rearmost edges of the sheet metal layers. In order to produce durable honeycomb bodies, it is not strictly necessary to braze each individual contact point between the sheet metal layers at the end side. With a suitable structure of the end-side edges of the sheet metal layers it is, for example, possible for 5%, preferably more than 10%, of the contact points which are theoretically possible between the metal sheets as a result of the structured sheet metal layers to have brazing material applied and be brazed by using conventional methods, since the contact points do not differ from those in honeycomb bodies with smooth end sides.

In accordance with an additional feature of the invention, the connection is preferably applied to honeycomb bodies which are formed from one or more stacks of metal sheets. The metal sheets of each stack have a predefined length and a predefined width, where the length is greater than the width, and the metal sheets of each stack in each case have several cutouts over the length. The cutouts are therefore situated at the longitudinal sides of the metal sheets, while the width sides are preferably, but not necessarily, formed without cutouts. Since, during the production of a honeycomb body, the width sides must typically be connected to the casing tube of the honeycomb body, cutouts are not necessarily advantageous there.

In accordance with yet another feature of the invention, the cutouts have rounded boundary lines, thereby largely avoiding notching effects, that is to say the tearing of the sheet metal edges in the region of the cutouts.

In accordance with yet a further feature of the invention, the cutouts are particularly preferably in the form of circular segments or sections, preferably in each case a semicircle or smaller circular segment or section. Since particle filters are, for example, produced from holed sheet metal layers, it is even possible, if appropriate, for the machines which are used in any case to generate holes in the sheet metal layers, to also be used for generating the cutouts at the edges of the metal sheets. It is even possible to provide wide sheet metal strips uniformly with holes, and to thereafter cut the sheet metal strips to the desired width, wherein the cutting lines should preferably run through the center of rows of holes.

In accordance with yet an added feature of the invention, in order to obtain the desired effect of avoiding soot depositions at the end sides, it is advantageous if more than 80% of the channels end in the region of at least one cutout at least at one end side of a honeycomb body according to the invention. This should particularly preferably be even more than 90% of the channels. It can be ensured in this way that even local accumulations of soot at the end side are avoided.

In accordance with yet an additional feature of the invention, the honeycomb body has at least one cavity at the inlet end side. The cavity is preferably disposed centrally and has, in particular, a conically narrowing section. One advantage of a structure of this type is that channels of different length are formed. Such channels result in pressure differences in relation to adjacent channels. This promotes a mixture of partial exhaust gas flows within the honeycomb body.

In accordance with again another feature of the invention, a structure of the honeycomb body in which a part of the channels is closed off close to the outlet end side, is also preferable. Such a closure of the channels can be carried out by pressing together the channel walls and/or by providing a blocking element. It is particularly preferable for at least a part of the channels which are disposed at the outer edge of the honeycomb body to be closed off, so that a flow which is forced within the honeycomb body enters through the cutouts into the inner partial volume.

In accordance with again a further feature of the invention, the honeycomb body has a plurality of partial volumes which have a different number of channels per unit of cross-sectional area from one another. A coaxial configuration of two partial volumes is preferable in this case (for example for cylindrical structures of the honeycomb body).

In accordance with a concomitant feature of the invention, the field of use of honeycomb bodies according to the invention is primarily the purification of the exhaust gas of internal combustion engines, especially of diesel engines. In particular, the removal of soot particles from the exhaust gas is the primary focus herein.

Other features which are considered as characteristic for the invention are set forth in the appended claims.

Although the invention is illustrated and described herein as embodied in a honeycomb body with fissured end sides, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
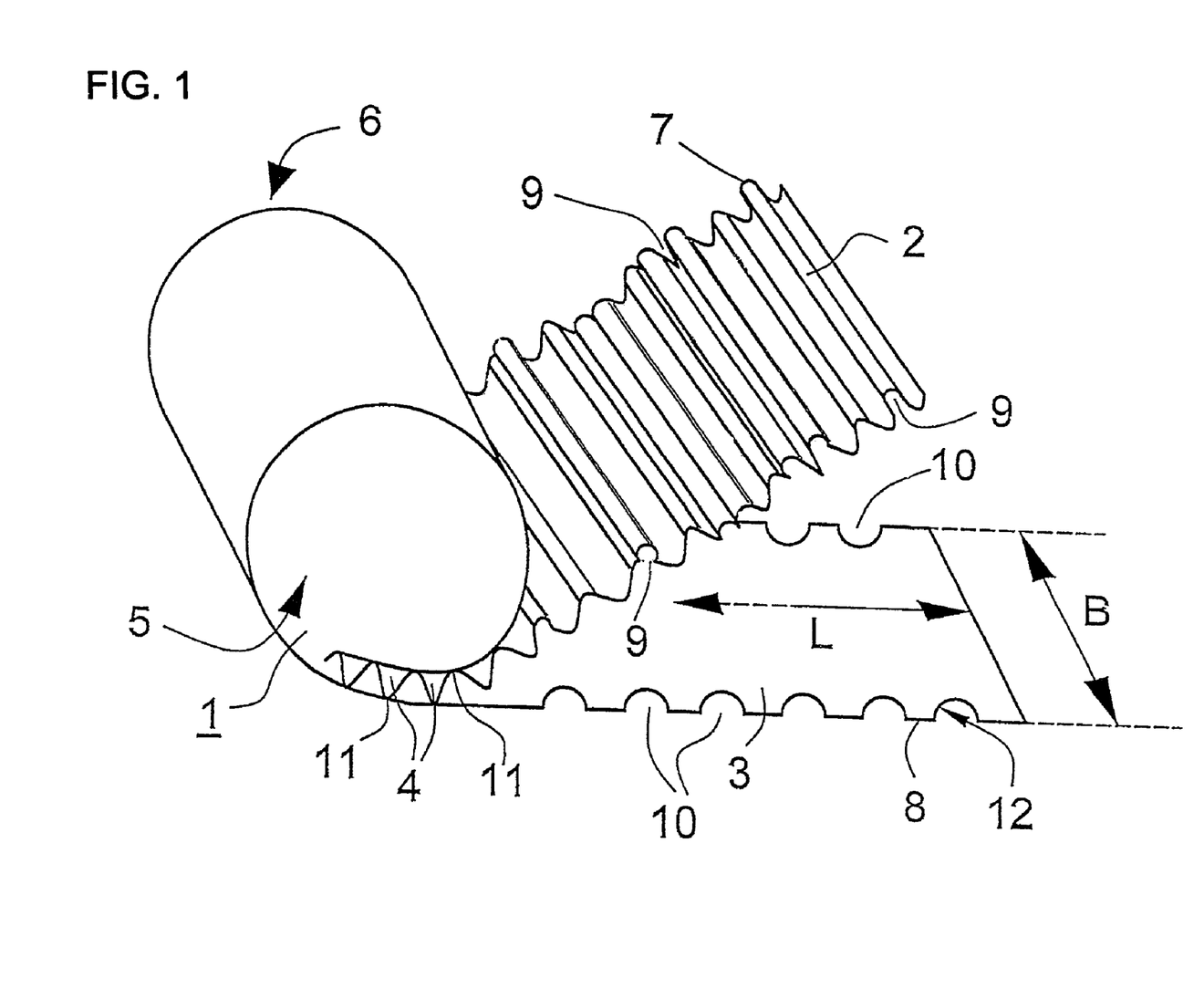
FIG. 1 is a diagrammatic, perspective view of a honeycomb body according to the invention during a production process.

Referring now to the figures of the drawings in detail and first, particularly, to FIG. 1 thereof, there is seen a diagrammatic view of a honeycomb body 1 during a production process. The honeycomb body 1 is constructed from a structured metal sheet 2 and a smooth metal sheet 3, with the structured metal sheet 2 having cutouts 9 at both longitudinal-side edges. The smooth metal sheet 3 has a width B, a length L as well as several cutouts 10 in end-side edges 8 over the length L. Boundary lines 12 of the cutouts 10 are rounded, so that the cutouts 10 have approximately the shape of circular segments. As the metal sheets 2, 3 are wound further, channels or passages 4 of the honeycomb body 1 are formed, with sufficient end-side connecting points 11 between the smooth and corrugated sheet metal layers 2, 3 still being generated despite the cutouts, notches or recesses 9, 10. The finished honeycomb body later has a fissured inlet end side 5 and a fissured outlet end side 6, but it is nevertheless possible, if required, for sufficient connecting points 11 to be brazed to one another through the use of conventional methods.

Figure 2:
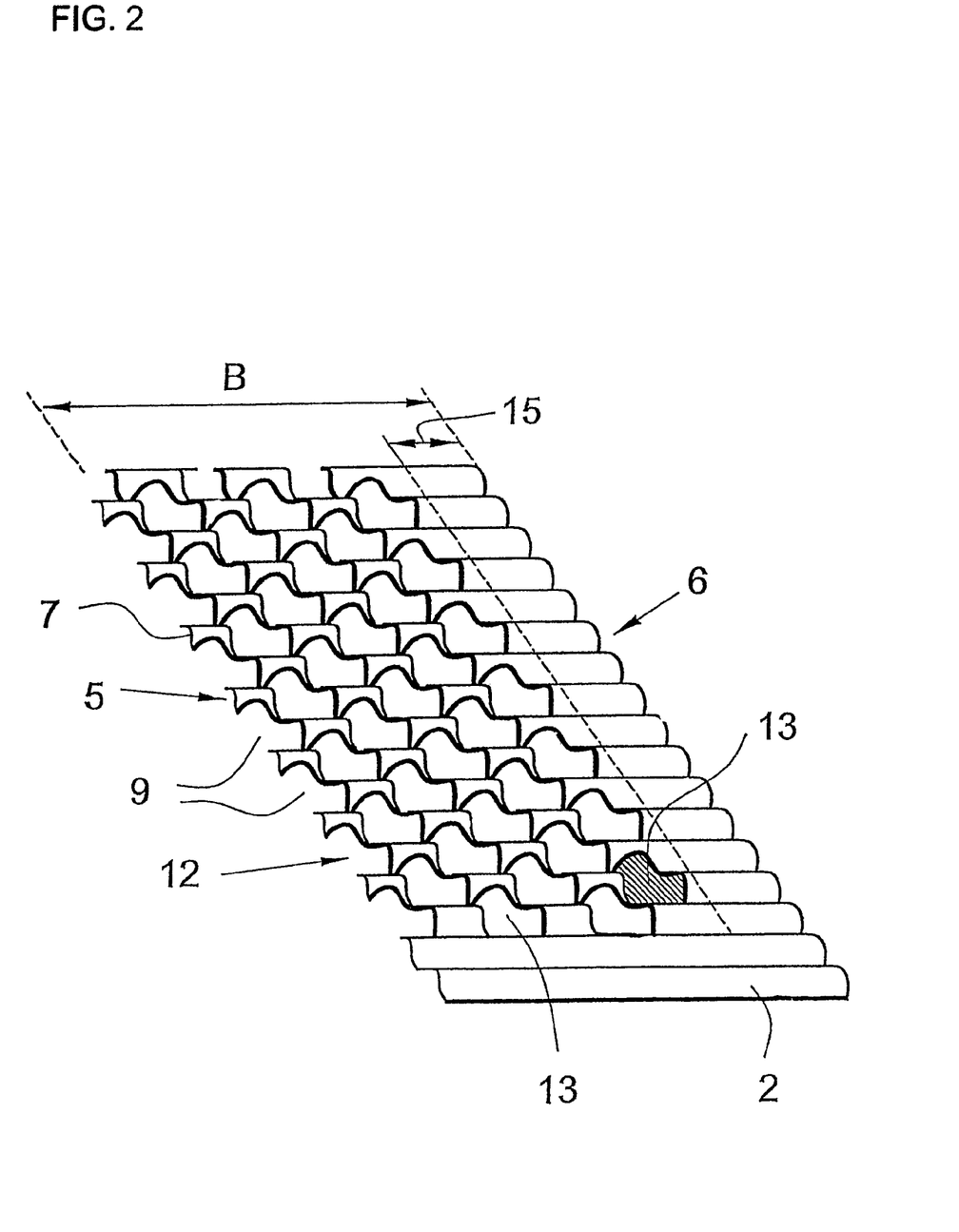
FIG. 2 is a perspective view of a structured metal sheet having cutouts according to the invention.

FIG. 2 shows a corrugated metal sheet 2 with the width B, which is suitable for constructing a honeycomb body according to the invention. In this exemplary embodiment, only the inlet end side 5 has cutouts 9, while the outlet end side 6 has an edge strip 15 without cutouts. The cutouts 9, which are in an end-side edge 7 of the corrugated metal sheet 2, have circular-segment-shaped boundary lines 12. In addition, openings 13 are provided in the interior of the structured metal sheet 2. The exact shape of the openings 13 and of the cutouts 9 in the present invention is arbitrary, but it can be advantageous to select the shapes in such a way that the projection of the openings or cutouts on the central plane of the structured metal sheet 2 has a circular or circular-segment-shape.

Figure 3:
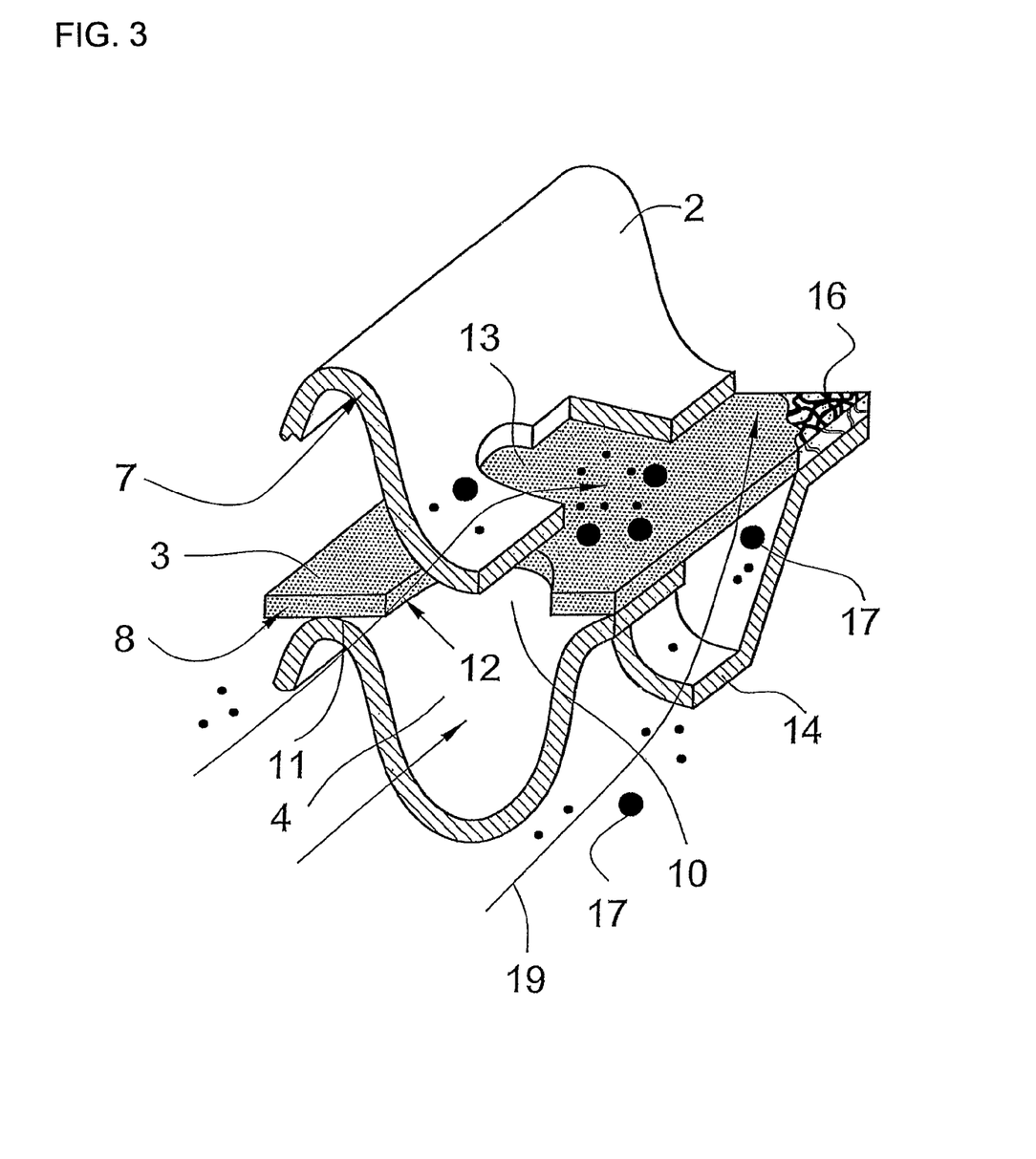
FIG. 3 is an enlarged, fragmentary, perspective view of a small end-side portion of a honeycomb body according to the invention.

FIG. 3 shows, in a diagrammatic, perspective illustration, typical conditions in a particle filter in which the exhaust gas is deflected through a porous, smooth layer 3 made from metallic fibers 16, by deflecting structures 14. Flow paths 19 are indicated by arrows. Soot particles 17 are deflected through openings 13 and by the deflecting structures 14 to the porous metal sheet layer 3, are held there and are converted. In this exemplary embodiment too, the accumulation of soot particles 17 on the end-side sheet metal edge 7 of the structured metal sheet 2 or on the end-side sheet metal edge 8 of the smooth metal sheet 3 can be reduced through the use of the cutouts 10 in the smooth metal sheet 3. In this case too, the boundary line 12 of the cutout 10 has approximately the shape of a circular segment. It can be seen that the cutout 10 influences the flow conditions as the flow enters into the adjoining channels 4, and an accumulation of particles is therefore less likely.

Figure 4:
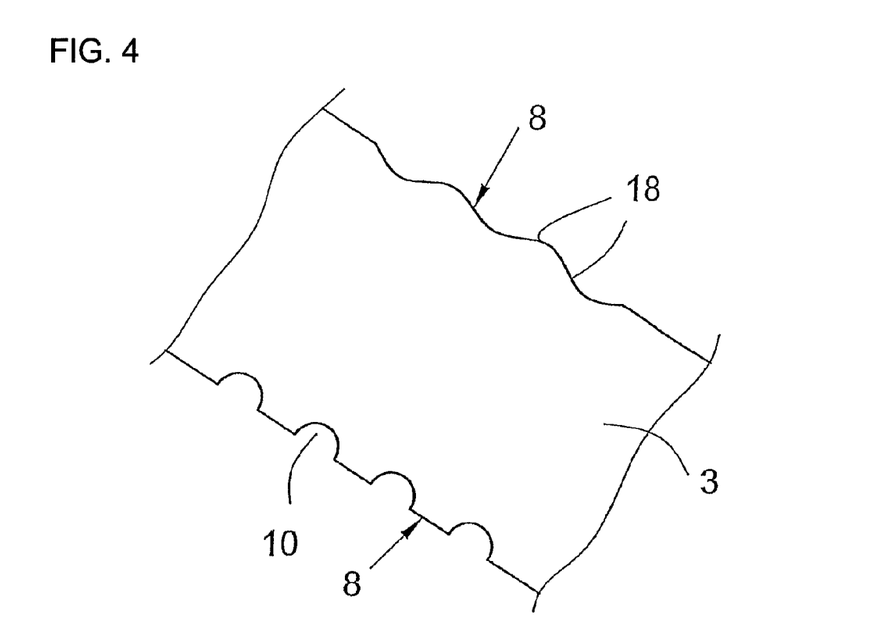
FIG. 4 is a plan view showing different possibilities of the construction of the edges of a metal sheet.

FIG. 4 diagrammatically illustrates different possibilities for the construction of the edges of a metal sheet having cutouts. In the present exemplary embodiment, one end-side sheet metal edge 8 of the smooth metal sheet 3 is provided with individual cutouts 10, while the opposite sheet metal edge has the shape of a wavy or undulating line 18. A wavy line 18 should also be considered within the context of the present invention as a sheet metal edge having cutouts.

Figure 5:
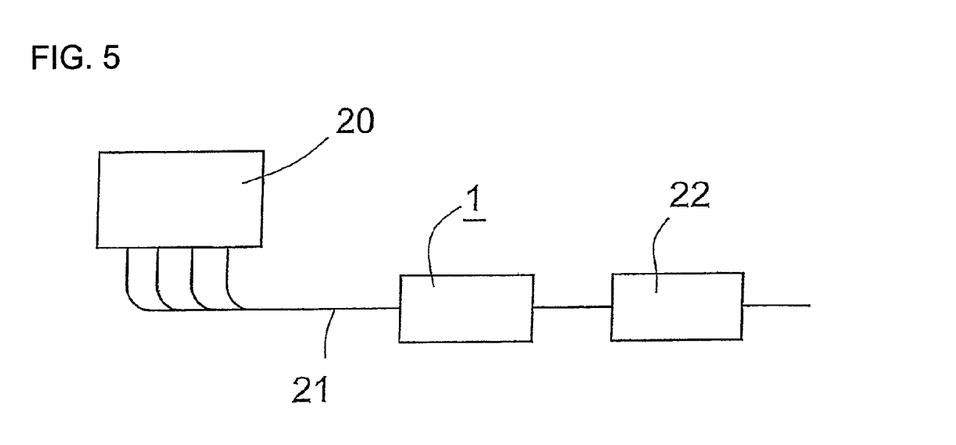
FIG. 5 is a block diagram illustrating the use of a honeycomb body according to the invention in an exhaust system of an internal combustion engine.

A typical installation situation of a honeycomb body 1 according to the invention is illustrated in FIG. 5. Exhaust gases pass from an internal combustion engine 20 into an exhaust system 21 which has the honeycomb body 1 according to the invention and, if appropriate, further components, in particular an oxidation catalytic converter 22 connected downstream.

Figure 6:
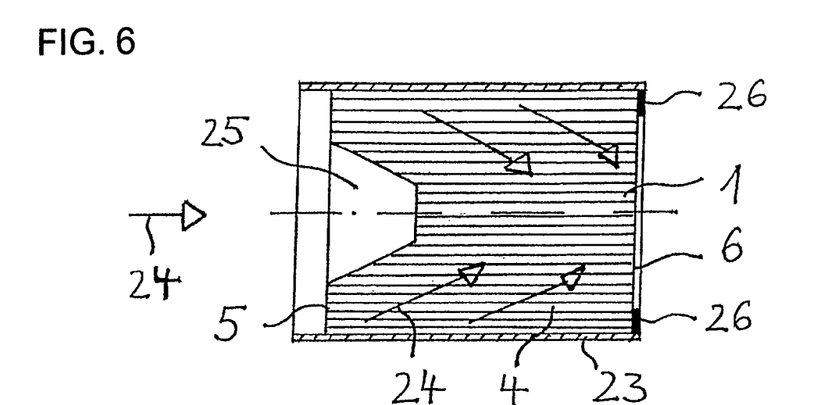
FIG. 6 is a longitudinal-sectional view of a further embodiment variant of a honeycomb body according to the invention.

FIG. 6 shows a honeycomb body 1 placed in a housing 23. The honeycomb body 1 has a centrally-disposed cavity 25 at the inlet end side 5. The cavity 25 has a conically narrowing shape. The channels 4, which have different lengths due to the cavity 25, create pressure differences, so that the exhaust gas which enters in an illustrated flow direction 24 is deflected in the interior of the honeycomb body as is diagrammatically illustrated by arrows. In order to intensify this effect, a part of the channels 4 is additionally closed off close to the outlet end side 6 through the use of a ring-shaped blocking element 26.

Figure 7:
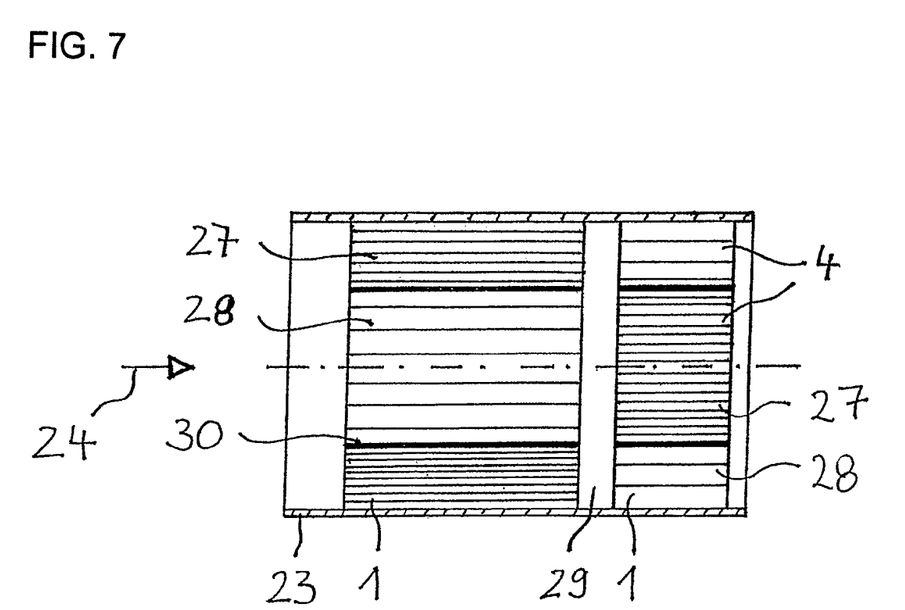
FIG. 7 is a longitudinal-sectional view of yet a further embodiment variant of a honeycomb body according to the invention.

FIG. 7 illustrates two honeycomb bodies 1 in one housing 23. The honeycomb bodies 1 each have two concentric partial volumes 27, 28 which have a different number of channels 4 per unit of cross-sectional area from one another. In this case, the honeycomb bodies 1 are spaced apart from one another with a gap 29, for example of less than 10 mm, and have an inverse configuration of the partial volumes 27, 28. Therefore, the partial volume 27, with a relatively high channel density, of the first honeycomb body, and the partial volume 28, with a relatively low channel density, of the second honeycomb body (as viewed in the flow direction 24), are situated opposite one another. In this case, the illustrated variant is preferred, in which the first honeycomb body has a first partial volume 27, with a high channel density, at the outside. The first partial volume 27 has, in particular, a channel density which is greater, at least by a factor of 1.5, than that of the second partial volume 28. The first partial volume preferably has a channel density in the region of at least 800 cpsi (cells per square inch, wherein 1 cpsi corresponds approximately to 6.4516 cells per square centimeter).

It is additionally advantageous, with regard to the considerable thermal and dynamic loadings of the honeycomb body 1 in the exhaust system of a vehicle, for at least one support element 30 to be provided at least partially between the partial volumes 27, 28. In the concentric configuration illustrated in this case, the support element 30 can, for example, be a tube section.

The present invention serves to further improve metallic honeycomb bodies when used as exhaust gas purification components, in particular for removing harmful particles from an exhaust gas. The invention prevents or reduces the deposition of particles, in particular soot, at the end sides of a honeycomb body.

The invention claimed is:

1. A honeycomb body, comprising:
   an inlet end side and an outlet end side;
   metal sheets being at least one of wound, intertwined or layered into a multiplicity of sheet metal layers having edges and being at least partially structured to form channels leading from said inlet end side to said outlet end side;
   said edges of at least some of said sheet metal layers having cutouts formed therein at least at one of said inlet end side or said outlet end side resulting in a fissured structure of at least one of said inlet end side or said outlet end side; and
   said metal sheets being substantially smooth metal sheets and corrugated metal sheets, at least said smooth metal sheets having said cutouts formed therein.

2. The honeycomb body according to claim 1, wherein said sheet metal layers are alternating layers of said substantially smooth and said corrugated metal sheets, and only said smooth metal sheets have said cutouts.

3. The honeycomb body according to claim 1, wherein at least some of said metal sheets are formed of porous material.

4. The honeycomb body according to claim 3, wherein said porous material is formed of compressed metal fibers.

5. The honeycomb body according to claim 1, wherein:
   said edges of said sheet metal layers include frontmost and rearmost edges;
   said edges of said metal sheets have sections without cutouts; and
   said sections are sufficiently long and frequent to provide a plurality of contact points statistically distributed between said frontmost and rearmost edges of said sheet metal layers.

6. The honeycomb body according to claim 1, wherein:
   said metal sheets are disposed in at least one stack of metal sheets;
   said metal sheets of each of said at least one stack have a length and a width, said length is greater than said width; and
   said metal sheets of each of said at least one stack have a plurality of said cutouts over said length.

7. The honeycomb body according to claim 1, wherein said cutouts have rounded boundary lines.

8. The honeycomb body according to claim 1, wherein said cutouts are shaped as circular segments.

9. The honeycomb body according to claim 1, wherein said cutouts are shaped as semicircles or smaller circular segments.

10. The honeycomb body according to claim 1, wherein more than 80% of said channels end in vicinity of at least one of said cutouts at least at one of said end sides.

11. The honeycomb body according to claim 1, wherein more than 90% of said channels end in vicinity of at least one of said cutouts at least at one of said end sides.

12. The honeycomb body according to claim 1, wherein the honeycomb body is part of an exhaust gas purification system of an internal combustion engine and contributes to removal of soot particles from exhaust gas of the internal combustion engine.

13. The honeycomb body according to claim 1, wherein the internal combustion engine is a diesel engine.

14. The honeycomb body according to claim 1, wherein said metal sheets have additional openings.

15. The honeycomb body according to claim 1, wherein said channels have deflecting structures.

16. The honeycomb body according to claim 1, wherein said metal sheets have additional openings, and said channels have deflecting structures.

17. The honeycomb body according to claim 1, wherein said inlet end side has at least one cavity.

18. The honeycomb body according to claim 1, wherein some of said channels are closed off close to said outlet end side.

19. The honeycomb body according to claim 1, which further comprises a plurality of partial volumes having a different number of channels per unit of cross-sectional area from one another.

* * * * *